United States Patent
Vergne et al.

(10) Patent No.: US 9,512,935 B2
(45) Date of Patent: Dec. 6, 2016

(54) MICROCHANNEL WITH AN OPENING AND/OR CLOSING AND/OR PUMPING DEVICE

(71) Applicants: FONDS ESPCI GEORGES CHARPAK, Paris (FR); CENTRE NATIONAL DE LA RECHERCHE SCIENTIFIQUE, Paris (FR)

(72) Inventors: Clemence Vergne, Paris (FR); Patrick Tabeling, Paris (FR); Yvette Tran, Paris (FR); Fabrice Monti, Saulx les Chartreux (FR); Lucie Devys, Palaiseau (FR)

(73) Assignees: FONDS ESPCI GEORGES CHARPAK, Paris (FR); CENTRE NATIONAL DE LA RECHERCHE, Paris (FR)

( * ) Notice: Subject to any disclaimer, the term of this patent is extended or adjusted under 35 U.S.C. 154(b) by 0 days.

(21) Appl. No.: 14/376,432

(22) PCT Filed: Feb. 22, 2013

(86) PCT No.: PCT/EP2013/053612
§ 371 (c)(1),
(2) Date: Aug. 25, 2014

(87) PCT Pub. No.: WO2013/124448
PCT Pub. Date: Aug. 29, 2013

(65) Prior Publication Data
US 2014/0373952 A1  Dec. 25, 2014

(30) Foreign Application Priority Data
Feb. 24, 2012 (FR) .................... 12 51722

(51) Int. Cl.
*B01L 3/00* (2006.01)
*F16K 99/00* (2006.01)
(Continued)

(52) U.S. Cl.
CPC ........ *F16K 99/0026* (2013.01); *B01L 3/50273* (2013.01); *B01L 3/502738* (2013.01);
(Continued)

(58) Field of Classification Search
CPC ................ B01L 2200/10; B01L 2300/0816; B01L 2300/0867; B01L 2300/087; B01L 2400/0421; B01L 2400/0481; B01L 3/50273; B01L 3/502738; B01L 7/52; F16K 99/0032; F16K 99/0049; Y10T 137/2191
See application file for complete search history.

(56) References Cited

U.S. PATENT DOCUMENTS 6,408,878 B2   6/2002  Unger et al.
6,488,872 B1 * 12/2002  Beebe .................. B01J 19/0093
                                                            264/139
(Continued)

FOREIGN PATENT DOCUMENTS

DE         10157317 A1     6/2003
DE    10 2004 062893 A1    6/2006
(Continued)

OTHER PUBLICATIONS

Baldi et al., "A Hydrogel-Actuated Environmentally Sensitive Microvalve for Active Flow Control", Journal of Microelectromechanical Systems, Oct. 5, 2003, pp. 613-321, vol. 12, No. 5, IEEE, U.S.

*Primary Examiner* — Jennifer Wecker
(74) *Attorney, Agent, or Firm* — Im IP Law PLLC; C. Andrew Im (57) ABSTRACT

A microchannel formed at the interface of two layers of material, at least one of the two materials being a substrate. A volume of the microchannel contains a film of polymer fixed by covalent bonding to the substrate layer. The film of polymer being formed from a hydrogel material susceptible to undergoing changes in volume under the action of an external stimulus. The hydrogel polymer is chosen from those which are sensitive to changes in temperature, light, electrical field or pH. A method for producing the microchannel.

11 Claims, 7 Drawing Sheets

(51) Int. Cl.
  *F04B 19/00* (2006.01)
  *B81B 1/00* (2006.01)
  *B01L 7/00* (2006.01)
(52) U.S. Cl.
  CPC ........ *F04B 19/006* (2013.01); *F16K 99/0032* (2013.01); *F16K 99/0036* (2013.01); *F16K 99/0038* (2013.01); *F16K 99/0049* (2013.01); *F16K 99/0061* (2013.01); *B01L 3/502776* (2013.01); *B01L 7/52* (2013.01); *B01L 2200/10* (2013.01); *B01L 2300/087* (2013.01); *B01L 2300/0816* (2013.01); *B01L 2300/0861* (2013.01); *B01L 2300/0867* (2013.01); *B01L 2300/161* (2013.01); *B01L 2400/0421* (2013.01); *B01L 2400/0481* (2013.01); *B01L 2400/0677* (2013.01); *F16K 2099/008* (2013.01); *F16K 2099/0078* (2013.01); *F16K 2099/0094* (2013.01); *Y10T 137/2191* (2015.04); *Y10T 137/2196* (2015.04)

(56) References Cited

U.S. PATENT DOCUMENTS

| | | | |
|---|---|---|---|
| 7,988,685 | B2 | 8/2011 | Ziaie et al. |
| 8,840,839 | B2* | 9/2014 | Iordanov ............... A61B 5/0008 356/436 |
| 2007/0026381 | A1* | 2/2007 | Huang ............... B01L 3/502746 435/4 |
| 2008/0305007 | A1* | 12/2008 | Cai .................... A61B 5/14532 422/68.1 |
| 2010/0151561 | A1* | 6/2010 | Richter ................ B01F 5/0646 435/287.2 |
| 2012/0258467 | A1* | 10/2012 | Chinnayelka ........ A61B 5/1451 435/7.1 |

FOREIGN PATENT DOCUMENTS

| | | |
|---|---|---|
| WO | 01/07506 A2 | 2/2001 |
| WO | 2004/023105 A2 | 3/2004 |
| WO | 2006/066541 A1 | 6/2006 |
| WO | 2008/049413 A2 | 5/2008 |

\* cited by examiner

MICROCHANNEL WITH AN OPENING AND/OR CLOSING AND/OR PUMPING DEVICE

RELATED APPLICATIONS

This application is a §371 application from PCT/EP2013/053612 filed Feb. 22, 2013, which claims priority from French Patent Application No. 12 51722 filed Feb. 24, 2012, each of which is herein incorporated by reference in its entirety.

TECHNICAL FIELD OF THE INVENTION

The present invention relates to the field of microfluidic systems, and more particularly to a microchannel, and the method of fabrication thereof, comprising an opening and/or closing and/or pumping device.

BACKGROUND OF THE INVENTION

Microfluidic systems are being used increasingly in fields as varied as chemistry, biology, physics, analysis, diagnostics, screening etc. There are various types, and notably those employing a substrate serving as base or support. The substrates used are of massive material, selected from glass, silicon, metal, polymers, or a combination of all these materials.

In microfluidic systems of this type, microchannels may be engraved in the substrate by any known method. A component that is massive or a thin layer will then cover the substrate, thus delimiting the geometry of the microchannels. The microchannels may also be obtained by molding an elastomer in a suitable mold and then being arranged on a substrate. These microchannels may be arranged to form a network in which fluids circulate.

So as to be able to control the movements of the fluids, it is often advantageous to integrate valves and pumps in the microfluidic network.

However, to allow the integration of valves and pumps, a great many obstacles must be overcome. Moreover, the known valve systems have important limitations.

For example, in the process for fabrication of the valve systems, numerous steps are necessary, and they frequently require the use of special materials, which limits their applicability.

Another drawback of the known valve systems is their size, typically greater than 50 microns, which limits the number of them in a microfluidic system.

Various solutions have been proposed in the past in an attempt to solve these problems.

Thus, U.S. Pat. No. 6,408,878 proposes a method for fabricating a structure in molded elastomer to form microvalves used for closing or opening microchannels in a microfluidic system. The method comprises the following steps:

forming a first layer of elastomer above a first micromachined mold, this first mold having a protuberance on its upper face which creates a recess on the bottom surface of said first layer of elastomer, forming a second layer of elastomer above a second micromachined mold, this second mold having a protuberance on its upper face which creates a recess on the bottom surface of said second layer of elastomer, applying the bottom surface of the second layer of elastomer on the top surface of the first layer of elastomer so that a first channel is formed in the recess between the first and the second layer of elastomer, positioning the first layer of elastomer above a flat substrate in such a way that a second fluidic channel is created in the recess between the first layer of elastomer and the substrate.

In this way, by applying a pressure in the first channel by means of a liquid or gaseous fluid, the top surface of the first layer is deformed and the second fluidic channel is thus closed.

These devices do, however, have many drawbacks, and in particular:

they require external circuits, comprising tubes and valves, for supplying and controlling the pressures in the microfluidic control channels. These external circuits become more complex as the number of valves integrated in the microfluidic system increases;

fabrication of submicrometric valves according to the method is long and expensive. Such fabrication requires masks of submicrometric precision and extremely thin elastomer membranes. In fact, it is the deformation of this membrane within the channel to be controlled that provides its closure or opening. Now, closure is only effected if the deformed membrane will completely obstruct the cross section of the microchannel in question. This requires very small thicknesses relative to the dimensions of the microchannel cross section and therefore great fragility. Moreover, control of the pressure of the fluid in the first channel must be very low and the control of this pressure must be very precise.

finally, the method requires the use of an elastomer as material, which limits its fields of application.

U.S. Pat. No. 6,488,872 also proposes a method for fabrication of microvalves used for closing or opening microchannels in a microfluidic system. The method comprises the following steps:

in a preliminary step, pillars are positioned in the microchannels, the microchannels are filled with a solution of photocrosslinkable monomers, through a mask, obtained for example by a photolithographic process, said solution of monomers is submitted to UV radiation around the pillars. Under the effect of this radiation, polymerization/crosslinking of the monomers in solution takes place around the pillars, which then become coated with a solid polymer layer. A monomer is selected such that said solid layer has the property of undergoing a volume change in is the presence of a stimulus (for example a change in pH or temperature of the fluid around said pillars).

Thus, to operate the microvalves, the stimulus in question is applied at the level of the pillars, which has the effect of swelling the layer until the microsystem is blocked.

These devices also have many drawbacks and in particular:

fabrication requires several steps: filling, photopolymerization, rinsing, the photopolymerization step requires micrometric precision for aligning the mask with the pillars. Moreover, the optical system providing illumination must be able to avoid phenomena of reflection and diffusion of UV radiation. In fact, such phenomena would have a destructive effect, causing polymerizations in undesirable places, which would have the effect of sealing the microchannels in said undesirable places, the adhesion of the polymers on the pillars is weak and uncontrolled, which leads to many drawbacks.

U.S. Pat. No. 7,988,685, like U.S. Pat. No. 6,408,878, employs two networks of microchannels separated by a membrane, but control is provided not by a change of pressure in one of the two networks but by the swelling caused by a hydrogel present in the control microchannel, which deforms the membrane and will close the channel.

OBJECT AND SUMMARY OF THE INVENTION

However, these devices still have the drawbacks described above regarding the first two patents cited: use of an elastomer, difficulties in fabrication, impossibility of reducing the dimensions in the submicron range, etc.

The present invention therefore aims to overcome one or more of the drawbacks of the prior art by proposing a microchannel opening and/or closing and/or pumping device. The device is simple to implement and does not require complex steps in its production.

For this purpose, the present invention proposes a microchannel formed at the interface of two layers of material, at least one of the two materials being a substrate, a polymer film being fixed on the substrate layer in a volume of the microchannel; said polymer film being formed of a material of the hydrogel type that undergoes volume changes under the action of an external stimulus, the polymer layer of the hydrogel type being grafted on the substrate by covalent bonding.

The presence of the hydrogel in the microchannels makes it possible, under the effect of one of the stimuli described, to close or open the microchannels. It is therefore the polymer layer grafted in the microchannel that plays the role of microvalves or micropumps at the level of the microchannel. The covalent bond allows vertical swelling, and eliminates mechanical shearing stresses between the hydrogel and the substrate surface to which it is attached.

According to one embodiment of the invention, the polymer of the hydrogel type is selected from those sensitive to variations of temperature, light, electric field or pH.

The invention also relates to a microfluidic system characterized in that it comprises at least one microchannel according to the invention.

The invention also relates to a method of fabrication comprising at least one step of fixation of a polymer of the hydrogel type on a substrate by covalent bonding, the polymer of the hydrogel type being capable of undergoing volume changes under the action of an external stimulus, on one face of a substrate arranged in the volume of a microchannel formed at the interface of two layers of material, at least one of the two materials being the substrate.

According to one embodiment of the invention, the step of fixation of the polymer of the hydrogel type on the substrate is carried out outside the microchannel.

According to one embodiment of the invention, the grafting step comprises two steps, a step of chemical modification of the polymer of the hydrogel type and a step of modification of the surface chemical properties of the substrate.

According to one embodiment of the invention, the grafting step is preceded by a step of synthesis of the polymer of the hydrogel type.

According to one embodiment of the invention, the polymer of the hydrogel type is synthesized by crosslinking between functionalized polymer chains, the polymer chains being synthesized by radical copolymerization.

According to one embodiment of the invention, the chemical modification of he polymers is an amidation by means of an amine bearing at least one vinyl group.

BRIEF DESCRIPTION OF THE DRAWINGS

Other aims, features and advantages of the invention will be better understood and will become clearer on reading the description given below, referring to the appended figures, given as examples:

FIGS. 2 to 4 describe the devices employed in different steps of an example of a method for fabrication of microchannels;

DETAILED DESCRIPTION OF THE EMBODIMENT

Figure 1:
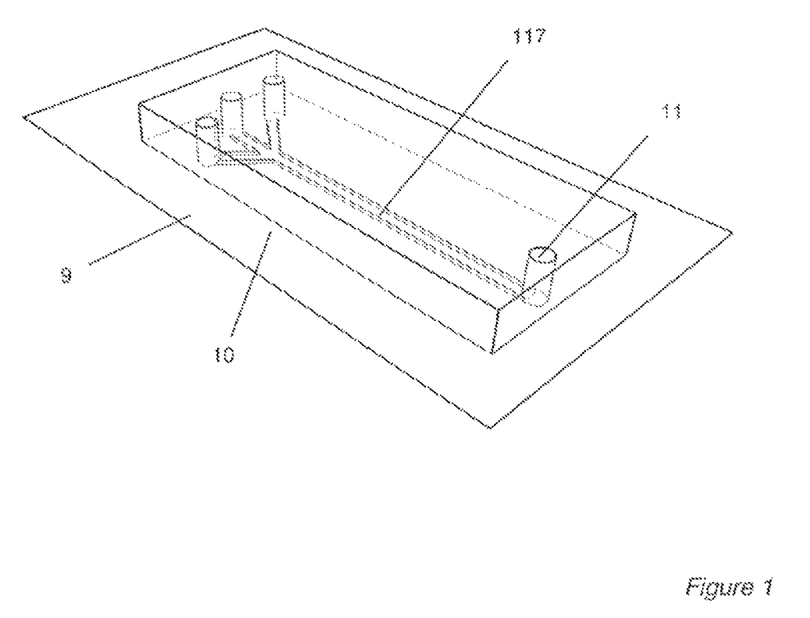
FIG. 1 is a top view of an example of a network of microchannels.
Figure 2:
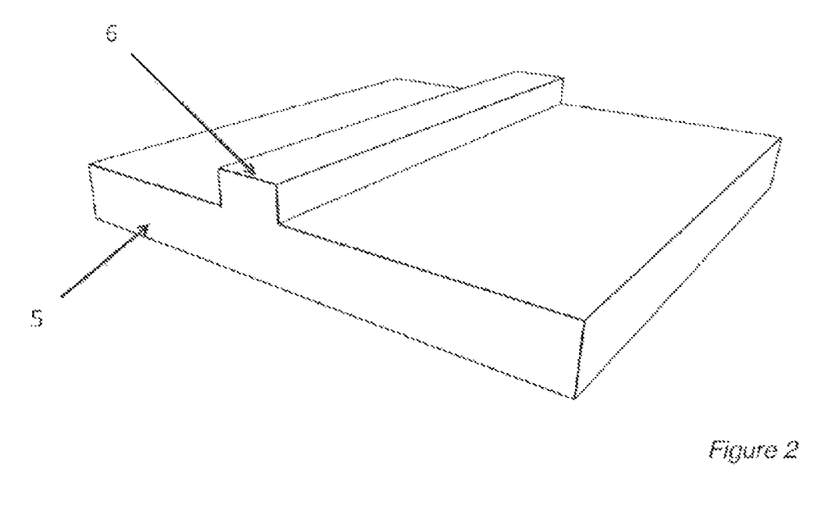
FIG. 2 shows an example of a micromachined mold.

The microchannels of the present invention (one example of which is illustrated in FIG. 1) are produced by a step of shaping a material. For example, this shaping step may be carried out by etching, by micromachining of glass or of silicon, by various techniques of molding with polymers: thermoforming or hot forming, polymer ablation, or polymer molding.

Depending on the technique used, the materials employed may be all types of polymers, and for example polymers such as polystyrene (PS), polycarbonate (PC), polyvinyl chloride (PVC), cyclic olefin copolymers (COC), poly(m- ethyl methacrylate) (PMMA), thermoset polyester (TPE), polyurethane methacrylate (PUMA), or acrylonitrile-butadiene-styrenes.

The materials may also be selected from photocrosslinkable or photosensitive liquids or adhesives, for example Norland Optical Adhesive (NOA).

Once the material has been shaped, the material is positioned on a layer of a flat substrate on which a layer of a polymer of the hydrogel type is grafted covalently. The molded material is positioned so that the recess, created by molding, etching or machining, forms a microfluidic channel on the hydrogel side.

Figures 9, 9A, 9B:
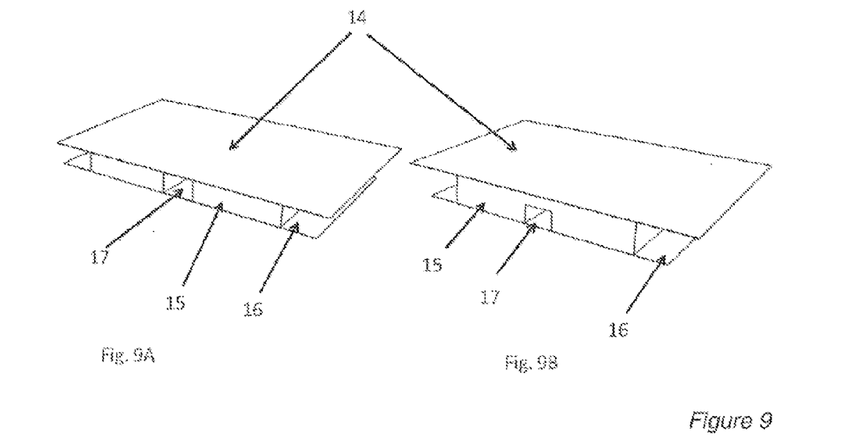
FIGS. 9A and 9B show the microsystem obtained after superposition of the first substrate and of the crosslinked material with the second substrate.

The microchannel (7, 17) (FIGS. 5 and 9) is thus formed at the interface of two layers of material, at least one of the two materials being a substrate (9, 14, 15, 16). A volume of the microchannel is contained in the recess formed in the material.

The polymer of the hydrogel type to be grafted, used in the context of the present invention and contained in the volume of the microchannel, is a water-insoluble polymer capable of constituting a gel with a high absorption capacity in the presence of a liquid or fluid. These polymers possess a high degree of flexibility. In fact, it is possible to increase their volume under the action of a stimulus such as variation of temperature, light, pH, or electric field. The polymer of the hydrogel type to be grafted is grafted in such a way that it is able to expand perpendicularly to its fixation plane, i.e. it can swell vertically. The stresses on the polymer of the hydrogel type are therefore perpendicular to the surface and there is no risk of causing ruptures of the attachment to the support.

In the context of the invention, the polymer of the hydrogel type is grafted with covalent bonds on a support in the microchannel.

According to one embodiment of the invention, the polymer of the hydrogel type is grafted on the support before it is inserted in the microchannel, i.e. outside the microchannel.

According to one embodiment of the invention, the polymer of the hydrogel type s grafted on the support when the support is already in the microchannel.

The presence of the grafted polymer (hydrogel) in the microchannels has the purpose of allowing closing or opening of said microchannels under the effect of one of the stimuli described. It is therefore the layer of polymer grafted in the microchannel that plays the role of microvalves or micropumps at the level of the microchannel.

The polymer grafted in the form of a layer on the substrate is simple to use and does not require a special technique. Notably, it is not necessary, as is the case in the prior art, to hollow out the substrate at the level of the microchannels so that the polymer of the hydrogel type can be embedded therein.

The microchannels according to the invention thus differ from those of the prior art in that they comprise a layer of hydrogel deposited on the substrate in contact with the opening forming the channel.

FIGS. 2 to 5 illustrate a first embodiment of a microchannel according to the invention. A first mold (5) is fabricated by any known method: micromachining, photolithography, laser ablation, microinjection, etc. and has a protrusion (6).

Figure 3:
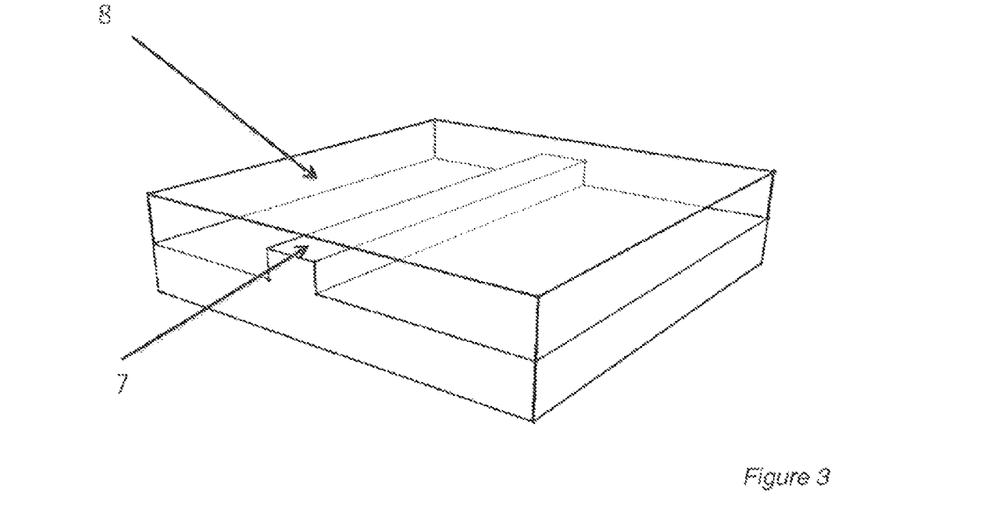
FIG. 3 shows molding a layer of elastomer on the micromachined mold.

An elastomer (8) is poured onto this mold (FIG. 2), then solidified thermally, in such a way that a recess (7) is created in the elastomer (8), corresponding to the reversed image of the protrusion (6) (FIG. 3).

Figure 4:
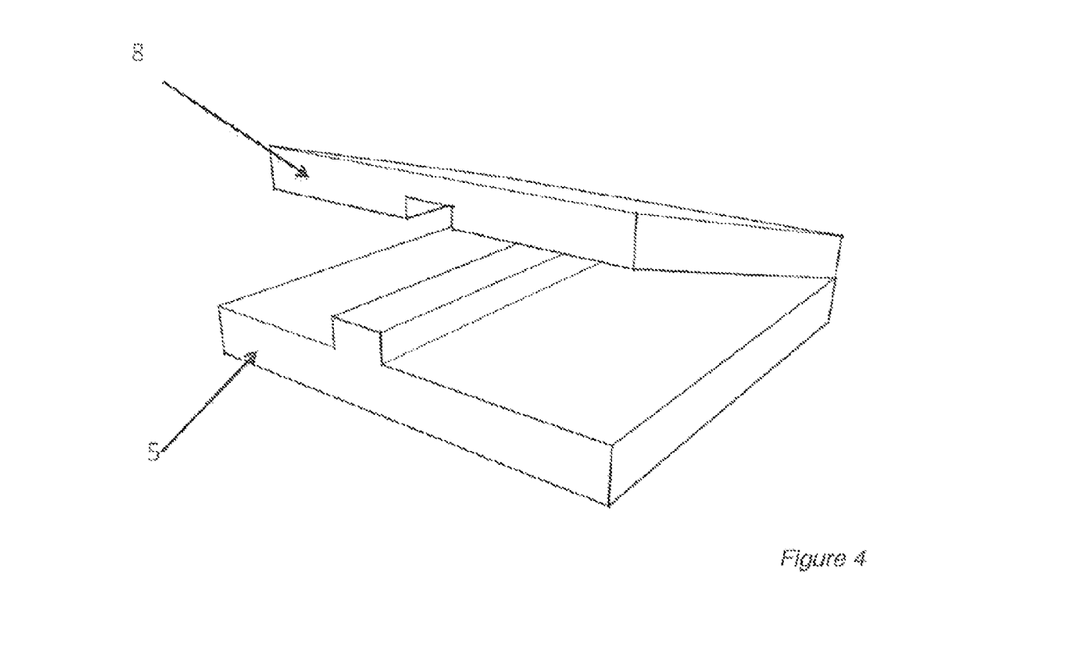
FIG. 4 shows the layer of elastomer separated from the micromachined mold.
Figure 5:
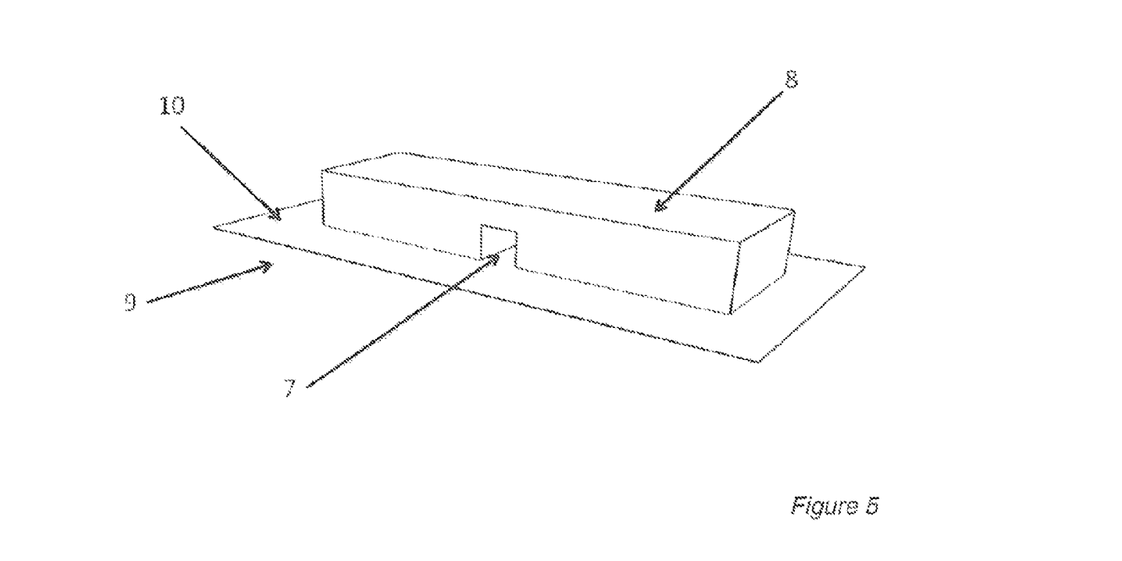
FIG. 5 shows a microchannel formed by the superposition of the layer of elastomer and a substrate.

The elastomer (8) is then removed from the mold (5), as illustrated in FIG. 4, and is then positioned above the flat substrate (9) on which the polymer of the hydrogel type (10) is grafted covalently (FIG. 5).

Figures 6, 6A, 6B:
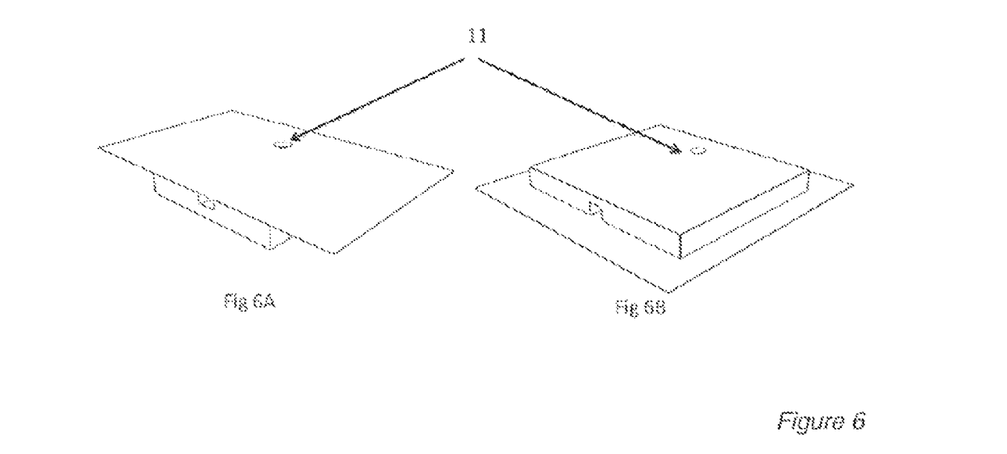
FIGS. 6A and 6B present two examples of a microchannel according to one embodiment of the invention.

The structure made of the elastomer (8) is then glued to the substrate (9) on the hydrogel side (10), recess (7) thus forming a microfluidic channel in which fluids may be led via holes (11) made either in the substrate (FIG. 6A) or in the elastomer (FIG. 6B).

The structure made of elastomer may be glued reversibly on the substrate, or irreversibly. It is possible to superpose, on this system, another layer of elastomer in which a charged fluid may be circulated, serving as liquid electrode when we wish to use an electric field as stimulus.

This technique makes it possible, if we wish to use an electric field as stimulus, to superpose, on this system, another layer of elastomer in which a charged fluid may be circulated, serving as liquid electrode.

Figure 7:
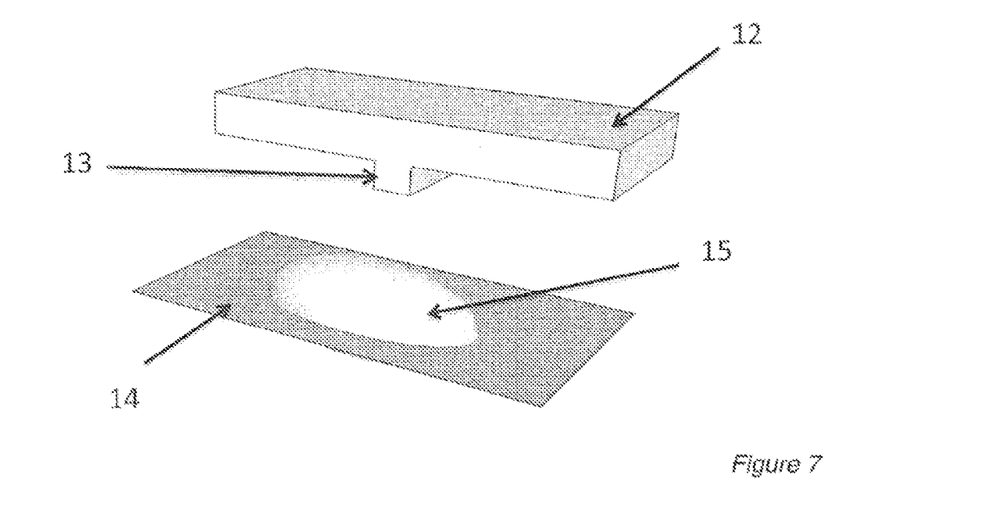
FIG. 7 shows an elastomer mold above a substrate on which a drop of photocrosslinkable liquid is deposited.
Figure 8:
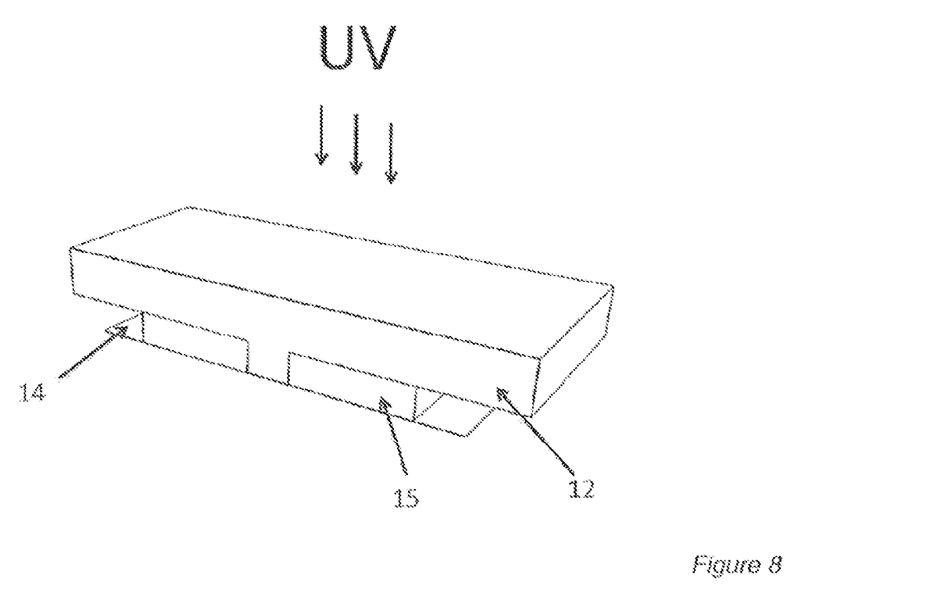
FIG. 8 shows the superposition of the elastomer mold and of the substrate on which a drop of photocrosslinkable liquid is deposited, and UV illumination intended to produce crosslinking of the photocrosslinkable liquid.

FIGS. 7 and 8 illustrate a second embodiment of the method according to the invention. This second embodiment uses a mold, called a stamp, made of an elastomeric material (12) and comprising a profile (13) complementary to that of the microchannel that we wish to produce. The mold is designed according to the method described above.

A first flat substrate (14) of solid material is placed parallel to this stamp (12). A sufficient amount of a photocrosslinkable or photosensitive liquid (15) is deposited on the substrate (14). The stamp (12) is placed on the substrate (14). As illustrated in FIG. 8, on exerting pressure on the stamp (12), the liquid (15) occupies the hollow spaces of the elastomer stamp. The liquid is then treated by irradiation or by heating until crosslinking occurs. The stamp is removed from the system consisting of the first substrate (14) and the crosslinked material (15). Said system is deposited on a second substrate (16), and the hydrogel is grafted on this second substrate.

With this technique, the microchannel (17) may be separated from the first substrate (14) by a thin layer of crosslinked material (15) as shown in FIG. 9B, or may be in contact with the first substrate (14) as shown in FIG. 9A.

The material forming the microchannels may be fixed or glued reversibly or irreversibly on the substrate, which may be advantageous when high pressures must be applied.

Production of the microvalves or micropumps integrated with the microchannels, and formed by the film of hydrogel, requires at least: a step of synthesis of a polymer, a step of grafting of the polymer. The grafting step comprises a step of chemical modification of the polymer and a step of modification of the surface chemical properties of the substrate.

For synthesis of the polymer to be grafted, which may be done by various methods, a great many monomers may be used. The choice of monomer for a given application is determined by the type of stimulus that will be used for actuating the microvalve or micropump. The polymer to be grafted may thus be selected from those sensitive to variations of temperature, light, electric field or pH.

If the stimulus is temperature change, we may choose to produce polymers at the lower critical solution temperature (LCST) or at the upper critical solution temperature (UCST), and for example poly-N-isopropylacrylamide (PNIPAM), If the stimulus is variation of light, it will be possible to use polymers of the type that are sensitive to temperature, on which a chromophore group, for example an azobenzene group, will have been grafted, If the stimulus is change in pH, it will be possible to use weak polyelectrolytes, for example poly(acrylic acid)

(PAA), poly(dimethylaminoethyl methacrylate)(PDMAEMA) or else weak polyampholytes, for example a PAA-co-PDMAEMA, If the stimulus is change in electric field, it will be possible to use polyelectrolytes, for example poly(acrylamidomethylpropane sulphonate) (PAMPS).

It may be advantageous to use copolymers, especially copolymers possessing acrylic acid units such as those known by the name PAA, which allow the functionalization necessary for formation of the hydrogel and grafting thereof on the surface.

Chemical modification of the polymers may be carried out in several ways. This modification step is necessary so as to be able to graft the hydrogels inside the microfluidic systems. The chemical modification may be, for example, an amidation by means of an amine comprising a vinyl group. A functionalized polymer is thus obtained.

The chemical modifications of the substrate surface that allow grafting of the hydrogel are carried out by various methods. The aim of this step is to graft the functionalized polymer on a modified surface of the microsystem, forming a self assembled monolayer (SAM) bearing thiol groups on which the functionalized polymer, mixed with a crosslinking agent, is deposited on said modified surface.

When the functionalized polymer is grafted on the substrate, and hydrated, it is thus possible to exploit its increase in volume or vertical swelling in a microchannel under the effect of a stimulus. This vertical swelling of the hydrogel may have three effects depending on the geometry of the system and the conditions of application of the stimulus:

it allows the hydrodynamic resistance of the microchannel to be modified if the latter is greater than the maximum swelling of the hydrogel, it allows the microchannel to be opened and closed reversibly if its section is smaller than the maximum dimension of the swollen hydrogel, which creates a system of valves.

it allows the microchannel to be opened and closed leading to displacement of the fluid within the microsystem, which creates a pumping system of very small size.

The functionalized polymer used in the context of the invention may be deposited on the substrate by mechanical deposition such as spin coating, dip coating, roll coating, spray coating, casting of solvent and particles (solvent casting), lixiviation, etc. In all cases, the layer of hydrogel is thus formed on the substrate by grafting with covalent bonding.

The functionalized polymer is deposited on the whole substrate surface or on only a portion of the substrate surface. The portion of the substrate surface covered by the hydrogel is for example between 1 nm$^2$ and 1 mm$^2$.

The anhydrous grafted polymer has a thickness for example between 1 nanometer and 10 microns. The hydrated grafted polymer has a thickness for example between 10 nanometers and 1 millimeter.

The microchannels have a length for example between 9.1 nanometer and 5 meters, and preferably between 1 nanometer and 1 millimeter.

The microchannels have a width for example between 0.1 nanometer and 5 millimeters, and preferably between 1 nanometer and 1 millimeter.

The microchannels have a height for example between 0.1 nanometer and 5 millimeters, and preferably between 1 nanometer and 1 millimeter.

The substrate is, for example, a massive material such as glass, silicon, a metal, a polymer, or else a combination of all these materials.

According to one variant, the substrate is covered with a gold film.

According to another variant, the substrate is transparent to infrared radiation.

According to one variant, the substrate is selected from the acrylonitrile-butadiene-styrene family.

The invention also relates to a microfluidic system (117) formed by at least one microchannel according to the invention.

The invention will now be illustrated with the following nonlimiting examples.

EXAMPLES

1. Examples of methods of Producing Microvalves or Micropumps

Production of the microvalves or micropumps comprises: a step of synthesis of the polymer to be grafted, a step of chemical modification of the polymer to be grafted and a step of modification of the surface chemical properties of the substrate.

1.1. Example of Synthesis of the Polymer of the Hydrogel Type

For carrying out the synthesis of the polymer of the hydrogel type, one or more monomers and a reaction initiator are put in a solution and a method of radical copolymerization is used.

For synthesis of a copolymer based on acrylic acid and N-isopropylacrylamide (PAA-co-PNIPAM), a redox initiating system is used with the ammonium persulphate/sodium metabisulphite pair: $(NH_4)_2S_2O_8/Na_2S_2O_5$.

A PAA-co-PNIPAM copolymer with 90% of NIPAM units is obtained after mixing 90% of NIPAM and 10% of AA.

Solutions of $(NH_4)_2S_2O_8$ and $Na_2S_2O_5$ are then added and polymerization is activated in the presence of the redox system.

After dialysis and lyophilization, the polymer is obtained in solid form.

1.2. Examples of Chemical Modifications to Allow Grafting of the Hydrogels on the Substrate The chemical modification of the polymer to be grafted may be an amidation, i.e. a reaction between an amine possessing a vinyl group and some of the acrylic acid units.

In the case of a PAA-co-PNIPAM with 10% of AA units, a proportion of the acrylic acid groups may be modified by grafting an allylamine on them.

For this, a stoichiometric amount of allylamine is introduced, relative to the amount of acrylic acid units that we wish to modify.

The PAA-co-PNIPAM, the allylamine as well as the hydrochloride of 1-(3-dimethylaminopropyl)-3-ethyl carbodiimide designated EDC, are mixed together.

In the presence of EDC, the carboxyl functions of the skeleton of PAA allow grafting of the amine functions on the latter.

Once synthesis is completed, dialysis and lyophilization are carried out. The functionalized polymer is thus obtained in solid form.

1.3. Examples of Grafting of the Hydrogel

Two examples of methods are described here for grafting the hydrogel on a modified surface of the microsystem by forming a self-assembled monolayer (SAM) allowing grafting of thiol groups, on which the functionalized polymer, mixed with a crosslinking agent, is deposited.

1.3.1. Example of a First Method

A microchannel is fabricated by the methods described in FIGS. 2 to 9. To modify the surface on which the polymer of the hydrogel type will be grafted, said surface is subjected to a solution containing a thiolated compound and a solvent. Then this surface is rinsed with the same solvent.

For example, if the surface is coated with gold, the solution may be a 0.3 millimolar mixture of dithioerythritol in chloroform and the solvent used in this case for rinsing the surface is chloroform.

For grafting the hydrogel on the substrate, it is dissolved in a mixture of solvent and crosslinking agent and this solution is introduced into the microsystem. After crosslinking, the system is rinsed with this same solvent.

1.3.2. Example of a Second Method

In this example, the hydrogel is grafted beforehand on a surface of a substrate and a microchannel is then fabricated starting from this substrate by the methods described in FIGS. 2 to 9.

For this it is necessary to modify the surface first and then graft the hydrogel.

This first step is carried out by silanization, in the case of a glass substrate, by a liquid route by dipping the glass in question in a 3% mixture of mercaptopropyltrimethoxysilane in toluene.

The next step is carried out by mechanical deposition. For example, the functionalized polymer initially in solid form is dissolved in a mixture of a solvent, for example butanol, and a thiol, for example dithioerythritol. The solution thus prepared is deposited by spin coating on the silanized glass.

2. Examples of Application of Microvalves or Micropumps

As already explained, several types of monomers and crosslinking agent, in various proportions, may be selected depending on the stimulus selected.

If the stimulus is the temperature, it is a copolymer of acrylic acid (AA) units and N-isopropylacrylamide (NIPAM), which undergoes a reversible transition around its LCST typically of the order of 32° C. At a lower temperature this copolymer is hydrophilic and is unfolded in aqueous solution whereas at a higher temperature it becomes hydrophobic and folds up on itself.

Synthesis of the copolymer is carried out by one of the two methods described above. A random copolymer is obtained, in which the monomer units are distributed randomly in the chain.

The NIPAM function is what is responsible for the activation by the temperature, while the AA function serves, after modification, for grafting the polymer on the surface. In this case the polymer used is a P(AA-co-NIPAM) with 10% of AA units.

Modification of the copolymer is also carried out by the method described above. Modification of the glass slide that is used as substrate is performed by silanization by the method described above.

Once this surface has been treated, a mixture of PAA-co-PNIPAM, butanol, and dithiol is deposited thereon by spin coating.

Figure 10:
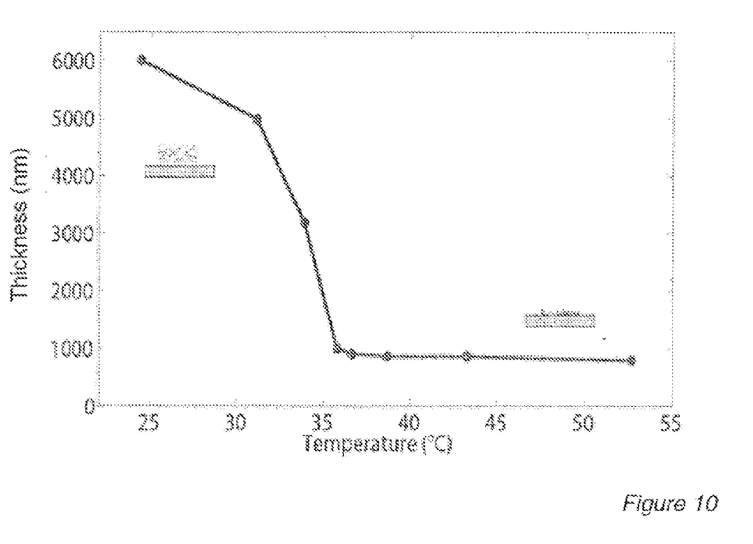
FIG. 10 shows variation of the thickness of the film of hydrogel as a function of temperature.

The thickness of the film may be characterized as a function of temperature by ellipsometry. In this example, the thickness of the hydrogel film decreases when the temperature rises, as shown in FIG. 10.

The microchannels are made in a hard material, called NOA (Norland Optical Adhesive), by one of the methods described above. A system is obtained possessing three walls of NOA and one wall of glass treated with the hydrogel.

In this example, the height of the microchannels may be between 1 and 10 microns, and preferably between 4 and 7 microns.

The temperature change is obtained in any known way. Thus, for heating, the polymer may be illuminated with electromagnetic radiation at frequencies corresponding to absorption peaks or else a resistance with an electric current passing through it may be used. For cooling, it is possible for example to use a Peltier effect module.

Figures 11, 11A, 11B:
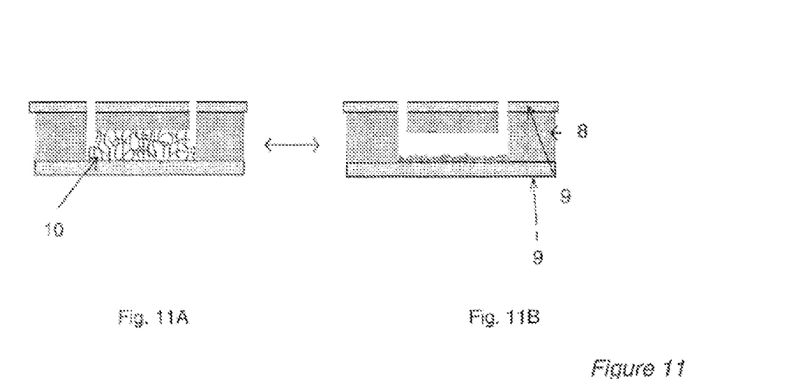
FIG. 11 is an illustration of the valve principle created by thermal activation of the hydrogel.
FIG. 11A is a sectional view of the microsystem for a temperature below 32° C., the hydrogel is unfolded and obstructs the microchannel.
FIG. 11B is a sectional view of the microsystem for a temperature above 32°, the hydrogel is folded and the microchannel is open.

FIG. 11 is an illustration of the principle employed in a microvalve with thermal activation of the hydrogel. If the pressure in the microchannel is kept constant, the changes in volume of the hydrogel induce a change in resistance of the microchannel and therefore in the flow rate of the fluid circulating therein. It should be noted that by measuring the flow rate in the microchannel, it is possible to deduce the thickness of the hydrogel. Thus, FIG. 11A illustrates a closed microchannel, at a temperature below 32° C., and FIG. 11B shows an open microchannel, at a temperature above 32° C.

Figure 12:
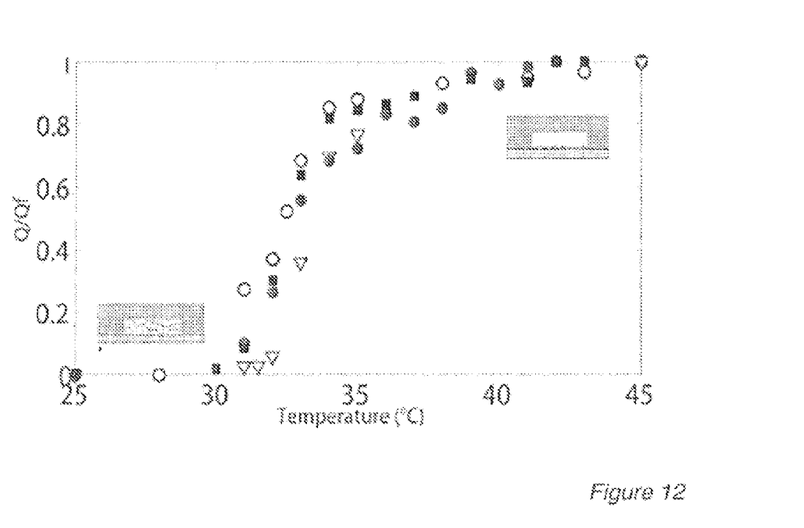
FIG. 12 shows the evolution of the flow rate (normalized by a reference flow rate $Q_f$) along a microchannel with a height of 4 microns, submitted to a pressure difference of 3 bar. Each symbol corresponds to experiments carried out in the same conditions.

FIG. 12 shows the evolution of the flow rate Q (normalized by a reference flow rate $Q_f$) along a microchannel with a height of 4 microns, submitted to a pressure difference of 0.3 MPa. In order to verify the repeatability of the swelling, several measurement cycles were carried out, each represented by a symbol.

Figure 13:
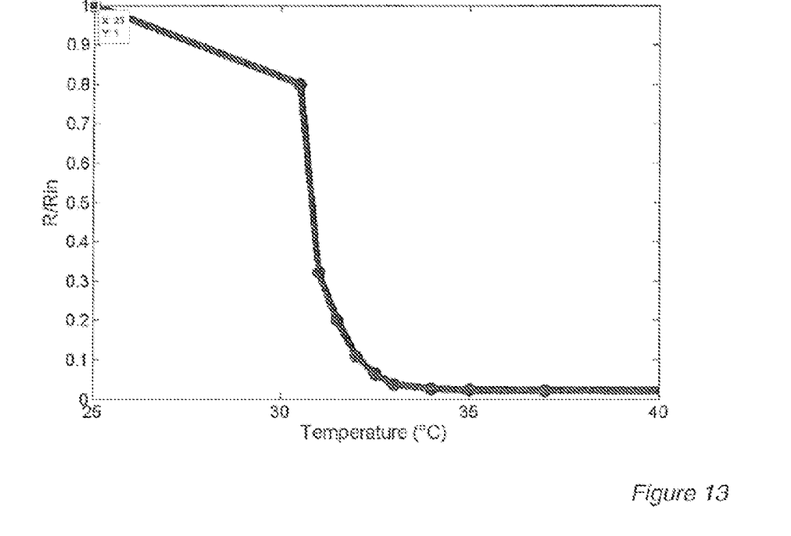
FIG. 13 shows an example of evolution of the normalized hydrodynamic resistance of a microchannel as a function of the temperature in a channel with a height of 7 microns.

FIG. 13 is a curve showing the evolution of the hydrodynamic resistance of the system as a function of the temperature in a microchannel with a height of 7 microns. When such a height is used, the microchannel is not fully closed when the hydrogel is at its maximum swelling.

Figure 14:
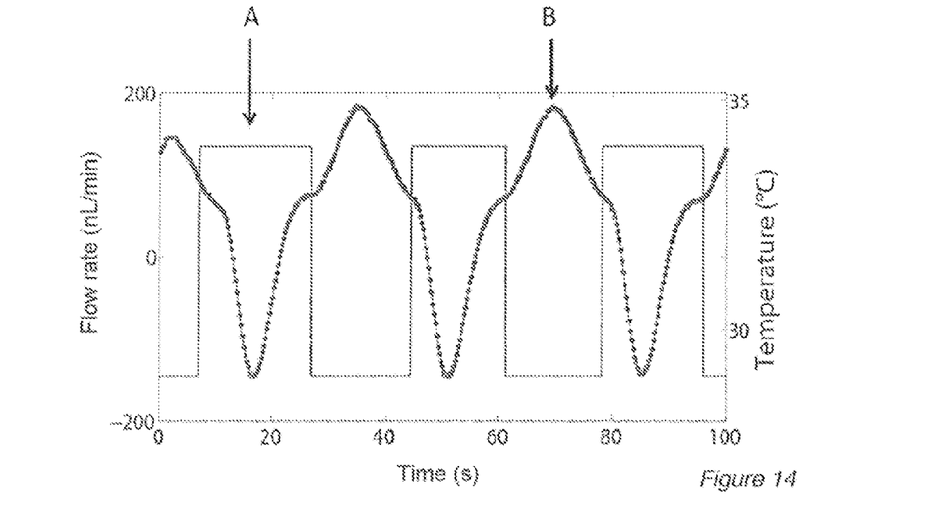
FIG. 14 depicts micropumping by thermal activation of the hydrogel.

In FIG. 14, curve A shows temperature cycles between 29° C. and 34° C. and curve B shows the corresponding evolution of the flow rate. It can be seen that the flow of the fluid has a slight delay relative to the temperature change.

Thus, the device according to the invention allows pumping systems to be generated by performing cycles of raising and lowering of the temperature.

It follows from what has just been described that it is possible to use a wide range of materials: elastomer, glass, silicon, polymer, etc. It is also possible to produce devices suitable for wide ranges of pressure, to have surface properties suitable for the intended applications, and to select a stimulus that is well suited to each application considered.

The material selected as substrate may be a good conductor of heat if the stimulus in question is the temperature.

Moreover, we may choose to deposit liquid or solid electrodes, for example in the form of thin films on the two surfaces that are opposite one another inside the microsystem.

Moreover, it is possible to use a material that is transparent o the wavelengths for activating the polymer, in the case when the stimulus is light.

The treatment of the substrate with the hydrogel may be carried out once the microsystem is closed, or may be carried out beforehand, with subsequent integration.

The scope of the present invention is not limited to the details given above and allows embodiments in many other special forms while remaining within the field of application of the invention. Consequently, the present embodiments are to be considered as illustrations, and may be modified, while remaining within the scope defined by the claims.

The invention claimed is:

1. A microchannel formed at the interface of two layers of material, a volume of said microchannel containing a film, said film being formed from a hydrogel type polymer material that is configured to undergo volume changes under an external stimulus action, wherein said film is grafted by covalent bonding on a substrate provided by one of the two material layers, wherein said film's substrate is flat and spans an entire width of said microchannel, and wherein said film is configured to reversibly modify a hydrodynamic resistance of said microchannel by undergoing said volume changes perpendicularly to said film's substrate.

2. The microchannel as claimed in claim 1, wherein the polymer of the hydrogel type is sensitive to variations of temperature, light, electric field or pH.

3. A microfluidic system comprising at least one microchannel as claimed in claim 1.

4. A method for fabricating a microchannel, comprising the steps of:
- grafting a polymer film on a substrate by covalent bonding;
- forming said microchannel at an interface of two layers of material, at least one of the two material layers providing said substrate for said polymer film, such that a volume of said microchannel contains said polymer film;
- wherein the polymer is a hydrogel type material that undergoes volume changes under an external stimulus action;
- wherein the step of grafting the polymer film of the hydrogel type on the substrate is performed prior to the step of forming said microchannel;
- wherein said polymer film's substrate is flat and spans an entire width of said microchannel; and
- wherein said volume changes occur perpendicularly to said polymer film's substrate, and the polymer film reversibly modifies a hydrodynamic resistance of said microchannel.

5. The method as claimed in claim 4, wherein the step of grafting comprises the steps of chemically modifying the polymer of the hydrogel type and modifying surface chemical properties of the substrate.

6. The method as claimed in claim 5, wherein the step of chemically modifying the polymer comprises the step of amidating the polymer by means of an amine bearing at least one vinyl group.

7. The method as claimed in claim 5, further comprising the step of synthesizing the polymer of the hydrogel type prior to the step of grafting.

8. The method as claimed in claim 4, further comprising the step of synthesizing the polymer of the hydrogel type prior to the step of grafting.

9. The method as claimed in claim 8, further comprising the step of synthesizing the polymer by crosslinking between functionalized polymer chains synthesized by radical copolymerization.

10. The microchannel of claim 1, wherein said microchannel is configured to be opened and closed reversibly by the volume changes of said film.

11. The microchannel of claim 1, wherein said microchannel is configured to be opened and closed by the volume changes of said film to displace a fluid.

* * * * *